United States Patent [19]

Shirasaki

[11] Patent Number: 5,352,950
[45] Date of Patent: Oct. 4, 1994

[54] VIBRATION WAVE DRIVEN MOTOR

[75] Inventor: Takayuki Shirasaki, Yokohama, Japan

[73] Assignee: Canon Kabushiki Kaisha, Tokyo, Japan

[21] Appl. No.: 996,862

[22] Filed: Dec. 28, 1992

Related U.S. Application Data

[63] Continuation of Ser. No. 677,422, Mar. 29, 1991, abandoned.

[30] Foreign Application Priority Data

| Mar. 30, 1990 | [JP] | Japan | 2-084491 |
| Mar. 30, 1990 | [JP] | Japan | 2-084492 |
| Jun. 7, 1990 | [JP] | Japan | 2-149207 |

[51] Int. Cl.⁵ .................................. H01L 41/08
[52] U.S. Cl. ........................................ 310/323
[58] Field of Search ............................. 310/323, 328

[56] References Cited

U.S. PATENT DOCUMENTS

| 4,739,212 | 4/1988 | Imasaka et al. | 310/323 |
| 4,831,305 | 5/1989 | Mukohjima et al. | 310/323 |
| 4,939,404 | 7/1990 | Inagaki et al. | 310/323 |
| 4,959,579 | 9/1990 | Kuwabara et al. | 310/323 |
| 4,983,874 | 1/1991 | Yamaguchi | 310/323 |
| 5,034,646 | 7/1991 | Shirasaki | 310/323 |

FOREIGN PATENT DOCUMENTS

| 0022479 | 2/1985 | Japan | 310/323 |
| 0058887 | 3/1987 | Japan | 310/323 |
| 62-77069 | 4/1987 | Japan | 310/323 |
| 0059776 | 3/1988 | Japan | 310/323 |
| 0213477 | 9/1988 | Japan | 310/323 |
| 0257475 | 10/1988 | Japan | 310/323 |
| 0265574 | 11/1988 | Japan | 310/323 |
| 0238473 | 9/1989 | Japan | 310/323 |
| 0248975 | 10/1989 | Japan | 310/323 |
| 0017872 | 1/1990 | Japan | 310/323 |
| 0017873 | 1/1990 | Japan | 310/323 |
| 2217925 | 1/1989 | United Kingdom | 310/323 |

Primary Examiner—Mark O. Budd
Attorney, Agent, or Firm—Fitzpatrick, Cella, Harper & Scinto

[57] ABSTRACT

A vibration wave motor, in which the slidable member, constituting the rotor either solely or in combination with a support member, is formed by injection molding of a composite resin, composed of a thermoplastic resin with the glass transition point at least equal to 100° C., preferably at least equal to 140° C., as the matrix resin and a fibrous reinforcing material.

7 Claims, 8 Drawing Sheets

VIBRATION WAVE DRIVEN MOTOR

This application is a continuation of application Ser. No. 07/677,422 filed Mar 29, 1991 now abandoned.

BACKGROUND OF THE INVENTION

1. Field of the Invention

The present invention relates to a vibration wave driven motor in which a voltage is applied to an electromechanical energy converting element to generate a travelling vibration wave in a vibration member, thereby causing a relative movement to a member in contact therewith by frictional drive.

2. Related Background Art

A vibration wave motor is composed of a vibration member for generating a travelling vibration wave, and a movable member maintained in friction contact therewith. More specifically, the conventional vibration wave motor, for example of a high output type, is constructed in the following manner. The above-mentioned vibration member for generating the travelling vibration wave is composed of an annular elastic member formed for example of stainless steel, on the rear face of which is adhered a group of thin piezoelectric elements formed in the same annular shape. The front face of the vibration member is formed as a hard sliding face by emission of an ultra hard material consisting of tungsten carbide and cobalt, followed by polishing. On the other hand, the movable member to be contacted with the front face of the vibration member is formed by laminating a slidable member on a metallic annular support member composed for example of an aluminum alloy. The slidable member is formed for example by forming a molded cylinder with a heat resistant resin with a glass transition point at least equal to 100° C., such as polyimide (PI), polyamidimide (PAI), polyetherimide (PEI), polyetheretherketone (PEEK), polyethersulfone (PES), polyarylate (PAR), polysulfone (PSF) or aromatic polyamide (PA) filled with a reinforcing material such as carbon fibers, and cutting the molded cylinder perpendicularly to the axis thereof to obtain an annular disk of a thickness for example of 1 mm. The movable member is formed by adhering the thus obtained slidable member of composite resin of the annular disk shape, with a heat-resistant adhesive, to the above-mentioned support member for example of aluminum alloy.

In the relative movement of the vibration member and movable member, either member theoretically maybe selected as the fixed one, and, in this sense, the above-mentioned movable member indicates a member causing relative movement with respect to the vibration member by frictional drive. However, it is conventionally customary to construct the vibration member as fixed, and, for the purpose of clarity, the member maintained in contact with the vibration member will be hereinafter called the "movable member".

In the conventional vibration wave motor, as explained above, the sliding face of the movable member is formed by a slidable member of composite resin, composed of a thermoplastic resin with the glass transition point at least equal to 100° C. as the matrix and reinforced by fiber filling. Such heat-resistant resin has little temperature dependence of the physical properties. Therefore, it is free from loss of torque resulting from the softening of resin and is capable of stabilizing the performance of the motor even at an elevated temperature encountered in the course of motor operation.

Also the addition of a reinforcing filler such as carbon fibers to said thermoplastic resin is, firstly, to constantly stabilize the state of the sliding face of the movable member against the ultra-hard sliding face, consisting of tungsten carbide and cobalt, of the vibration member and to ensure a sufficient abrasion resistance for a prolonged operation with a large load torque, and, secondly, to improve the performance of the vibration wave motor such as the output thereof by increasing the physical properties such as elastic modulus or thermal conductivity of the movable member.

As explained in the foregoing, the conventional vibration wave motor, in which the sliding face of the movable member is formed by a slidable member of reinforced composite resin composed of a heat-resistant thermoplastic resin with the glass transition point at least equal to 100° C. and reinforced with a filler such as carbon fibers, shows a high abrasion resistance of the movable member even in a prolonged frictional drive by the ultra-hard vibration member, and also shows high motor performances such as output and efficiency.

However, such conventional vibration wave motor has been associated with a fluctuation in torque, exceeding 5% of the rated torque when continuously driven under rated conditions, and an improvement in the stability of torque is desirable.

According to the investigations by the present inventors, said fluctuation in torque is attributable to the local unevenness in distribution of the reinforcing fibers added in the slidable member and the unevenness in orientation of said fibers.

Also such conventional vibration wave motor has been associated with an undulation in torque, with the temperature increase in the faces in frictional contact, when continuous drive is started with rated conditions such as 4 kg.cm, 100 rpm.

Furthermore such motor has been associated with so-called "squeaking" resulting from sliding friction in operation without load or with a low load torque, though this drawback is not encountered when the load torque is large.

In addition to the above-mentioned drawbacks related to the characteristics of the vibration wave motor, the cost of the movable member is difficult to reduce because the slidable member is cut out from a molded cylinder. More specifically, the preparation of the movable member requires a series of steps, such as polishing the thus cut-out sliding member and the adhesion face of the support member to a suitable coarseness, then fixing the members by exposing them in a mutually contacted state with heat-resistant adhesive therebetween in an electric furnace for example of 60° C. for several hours, correcting the dimensions by grinding the external and internal walls, and effecting a final finishing of the sliding face by polishing.

SUMMARY OF THE INVENTION

An object of the present invention is to provide a vibration wave motor with reduced fluctuation in torque.

Another object of the present invention is to provide a vibration wave motor with reduced variation in torque in operation under nominal conditions.

Still another object of the present invention is to provide a vibration wave motor capable of eliminating noises in operation without load or with a low load torque.

Still another object of the present invention is to provide an inexpensive vibration wave motor.

The foregoing and still other objects of the present invention will become fully apparent from the following description.

SUMMARY OF THE INVENTION

The vibration wave motor of the present invention includes a sliding member of composite resin formed by injection molding a material composed of a thermoplastic resin with the glass transition point at least equal to 100° C., preferably at least equal to 140° C., as the matrix resin, and a fibrous reinforcing material.

In another feature of the present invention, a fibrous reinforcing material is added to the matrix resin as explained above and the fibers of the reinforcing material are oriented in the circumferential direction, for example, of an annular movable member in the injection molding thereof.

Such orientation of the fibrous reinforcing material can be achieved, for example, by injection molding with a one-point side gate.

The fibrous reinforcing material can be at least a material selected for example from carbon fibers, graphite fibers, carbon whiskers and potassium titanate whiskers, and is generally added in an amount of 10-40 wt.%, preferably 15-30 wt.% with respect to the matrix resin.

Due to the above-mentioned orientation of the fibrous reinforcing material, the movable member constituting the vibration wave motor of the present invention provides uniform surface properties and strength in the sliding face of the sliding member. More specifically, in the sliding member, for example of an annular shape, composed of fiber-reinforced composite resin according to the present invention, the fibers are oriented along the circumference and dispersed uniformly along the circumference of the sliding face, so that the elastic modulus etc. of the sliding member shows anisotropy, larger in the circumferential direction and smaller in the perpendicular direction. Thus the properties and strength of the sliding face are made uniform along the circumferential direction, thereby reducing the fluctuation in torque, in continuous drive under rated conditions.

In addition, undulation of torque in continuous drive under rated conditions can be reduced by the use, as the matrix resin, of a thermoplastic resin of a higher heat resistance than in the conventional movable member.

Furthermore, the slidable member of fiber-reinforced composite resin of the present invention, showing above-mentioned anisotropy in the circumferential and perpendicular directions, has an effect of reducing the squeaking noise in the zero load operation. Particularly when the matrix resin is composed of aromatic polyester resin, the vibration attenuating effect resulting from the multi-layered structure of this resin also contributes to a further reduction of such noise.

The above-mentioned slidable member of the present invention may contain, in addition to the fibrous reinforcing material mentioned above, at least a fluorinated resin and at least a lead oxide as lubricant, and the presence thereof provides effects of improving the lubricating property and stabilizing the friction coefficient in the sliding movement at high temperature. An example of the fluorinated resin lubricant for such purpose is polytetrafluoroethylene (PTFE), and an example of the lead oxide lubricant is lead monoxide (PbO). The amount of such lubricants, in the case of the fluorinated resin, is generally in a range of 5-40 wt.%, preferably 5-30 wt.%, with respect to the matrix resin. A larger amount reduces the friction coefficient but deteriorates the mechanical strength and the abrasion resistance, while a smaller amount also deteriorates the abrasion resistance and results in an unstable friction coefficient.

In the vibration wave motor of the present invention, the movable member constituting a part of the motor can be composed not only of an injection molded component which can be integrally fixed to a metallic support member, but also, and preferably, of an integral component of composite resin formed by injection molding, with suitable shape and thickness matching the desired characteristics of the vibration wave motor. Thus the injection molded slidable member of composite resin may be used as the movable member without any finishing steps.

In the movable member constituting the vibration wave motor of the present invention, the slidable member constituting the sliding face (the slidable member either solely constituting the movable member or being integrally adhered to a metallic support member to constitute the movable member) is featured by a structure that the fibrous reinforcing material is dispersed uniformly and oriented along the circumferential direction on the sliding face, and provides, therefore, an advantage that the properties of the sliding face and the strength of the movable member are made uniform in the circumferential direction. Also the in case the movable member is solely composed of an injection molded component employing heat-resistant thermoplastic resin with the glass transition point at least equal to 100° C., particularly in the case employing aromatic polyester resin having a specific multi-layered structure as the matrix resin, there can be achieved a significant cost reduction as many manufacturing steps can be dispensed with in comparison with the conventional slidable member which has been cut into an annular disk from a molded cylinder and adhered to a metallic support member.

The sliding face of the above-mentioned movable member is preferably polished so as to obtain necessary flatness and coarseness and to expose the fibrous reinforcing material on the sliding face, thereby eliminating the difference between the initial characteristics and those after use of the motor.

Also in order to obtain a sufficient abrasion resistance to the sliding face of the slidable member of composite resin, the sliding face of the vibration member is preferably formed as an ultra hard face (for example a Vickers hardness Hv=1200) composed of tungsten carbide and cobalt,

Figure 5A:
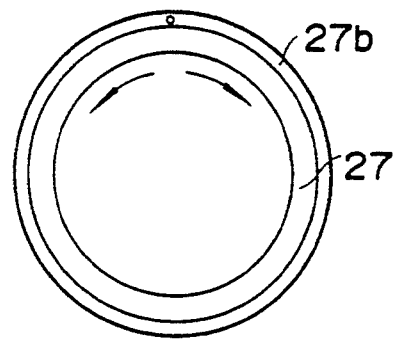
Figure 5B:
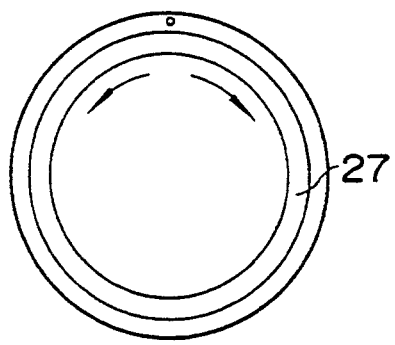
Figure 6:
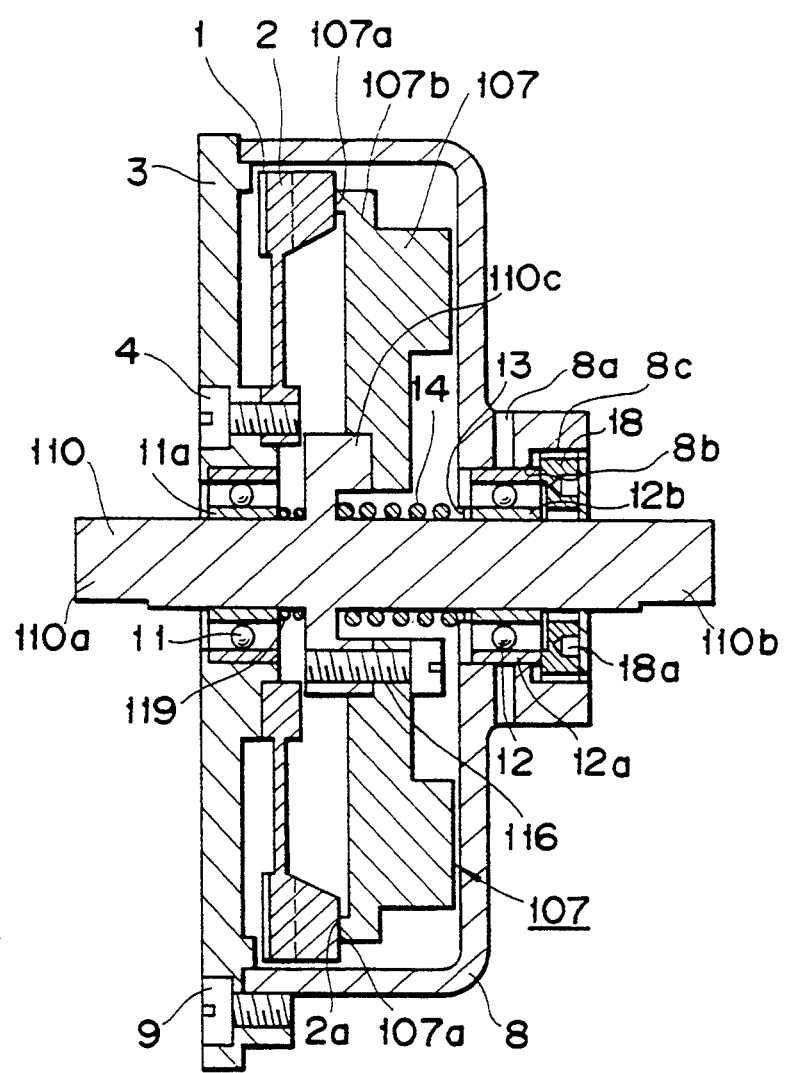
Figure 8:
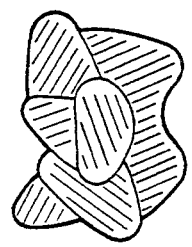
Figure 9:
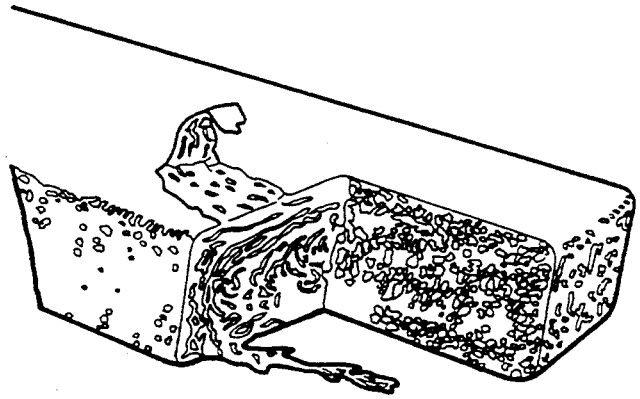
Figure 10:
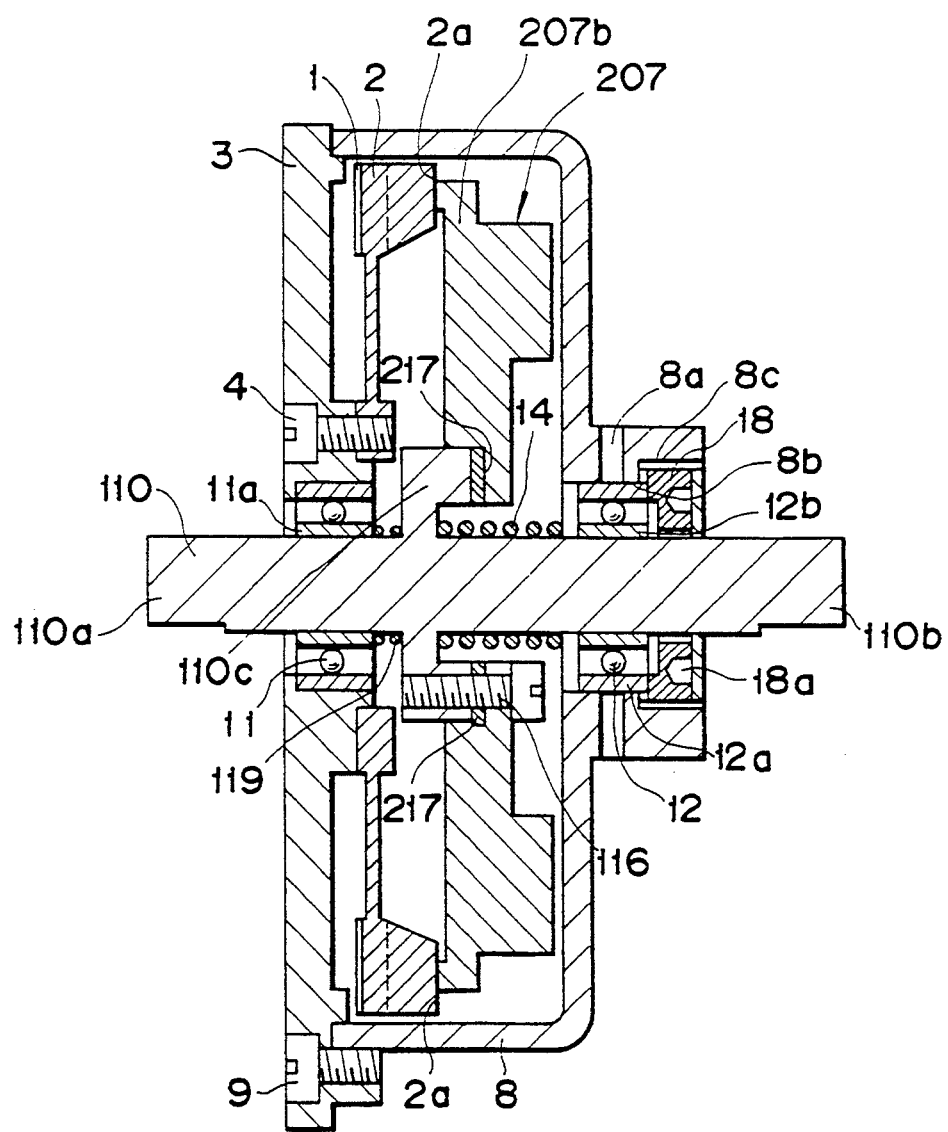
Figure 11A:
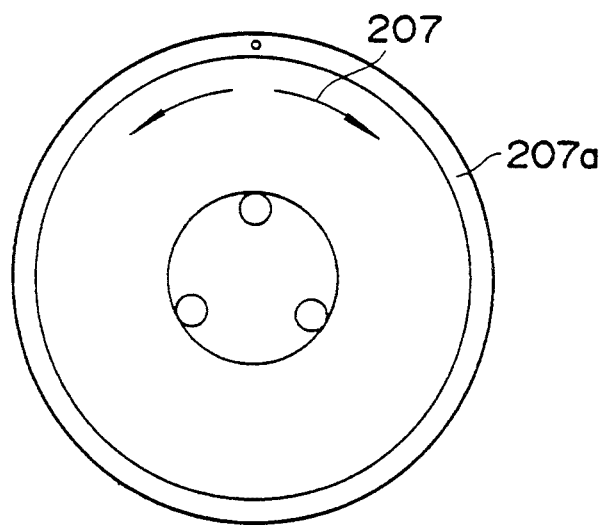
Figure 11B:
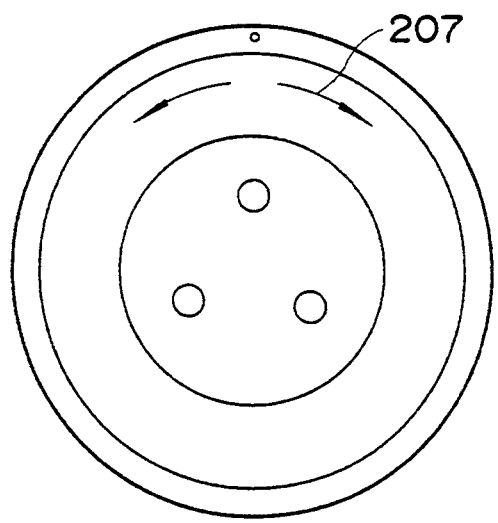

Fig, 4 is a longitudinal cross-sectional view of a second embodiment of the vibration wave motor of the present invention;

FIGS. 5A and 5B are views showing the injection molding method for forming a slidable member employed in the second embodiment;

FIG. 6 is a longitudinal cross-sectional view of another embodiment of the vibration wave motor of the present invention;

Figs, 7A and 7B are views showing the injection molding method for forming a movable member employed in embodiment of FIG. 6;

FIG. 8 is a view showing the structure of the movable member, in the vibration wave motor of the present invention, employing aromatic polyester resin and orienting the fibrous reinforcing material in a specific direction in the injection molding;

FIG. 9 is a view showing the structure of the reinforcing fibers in such case;

FIG. 10 is a longitudinal cross-sectional view of another embodiment of the vibration wave motor of the present invention; and FIGS. 11A and 11B are views showing the injection molding method for forming a movable member employed in the embodiment of FIG. 10.

DESCRIPTION OF THE PREFERRED EMBODIMENT

Now the present invention will be clarified in detail by preferred embodiments thereof shown in the attached drawings.

First embodiment

Figure 1:
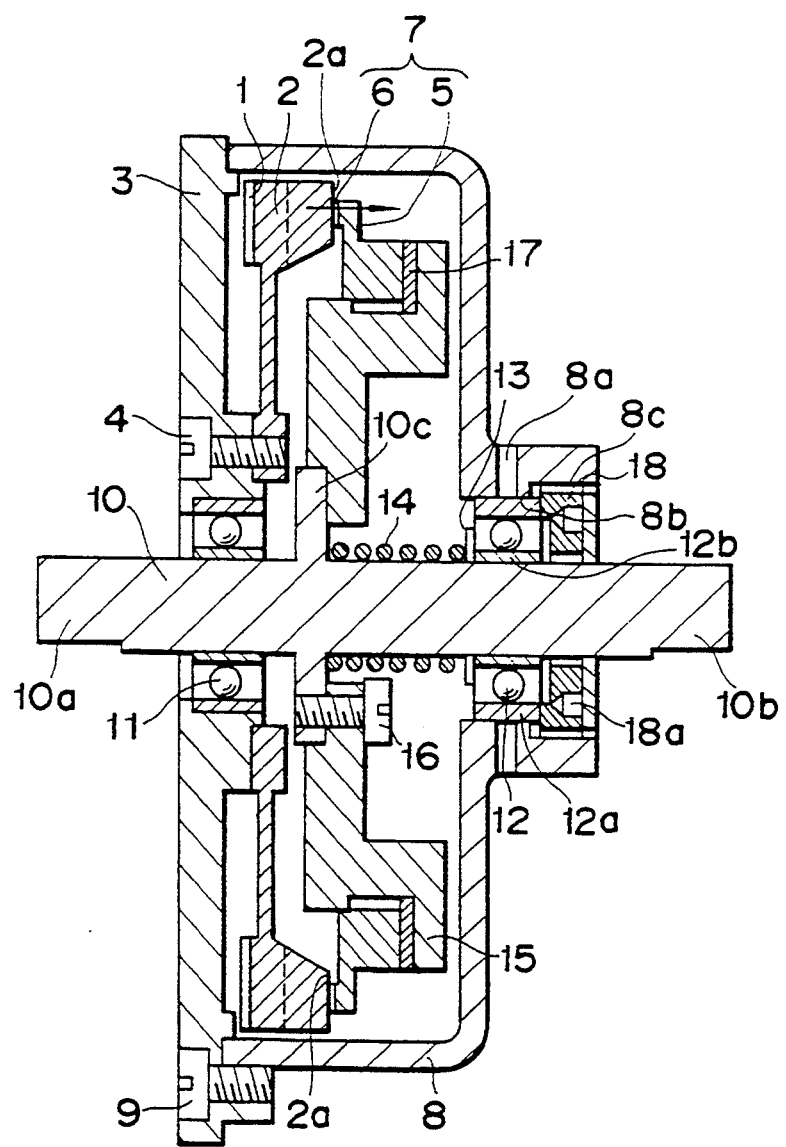
FIG. 1 is a longitudinal cross-sectional view of a first embodiment of the vibration wave motor of the present invention.

FIG. 1 is a longitudinal cross-sectional view of an embodiment of the vibration wave motor of the present invention.

An annular base plate 2 of the vibration member, composed of a metal material such as stainless steel, is provided on the rear face thereof with a group of piezoelectric elements 1, which are formed as a thin circular shape and are concentrically adhered with heat-resistant epoxy adhesive. Also the sliding face at the front side is comb-shaped, with plural circumferential grooves dug in the axial direction, in order to increase the amplitude of a travelling vibration wave generated in known manner. A casing 3 composed of a metal of a high thermal conductivity is provided, at the center thereof, with a first ball bearing 11, and said the vibration member 2 is fixed with screws 4 concentrically with said the first ball bearing 11.

An output shaft 10 has a flange 10c in the middle thereof. An end side the 10a of said shaft passes through the internal ring of the first ball bearing 11 and is axially slidably supported thereby, while the other end side 10b passes, axially slidably and rotatably, through the internal ring of a second ball bearing 12 to be explained later and a shaft hole of a spring pressure regulating nut 18 to be explained later. A disk-shaped intermediate member 15 is fixed by a screw 16 on the flange 10c of the output shaft 10, and, on its external periphery, an annular movable member 7 is concentrically fitted and fixed.

Movable member 7 is composed of an annular support member 5 of a metal of high thermal conductivity such as an aluminum alloy, and a slider 6 concentrically is adhered to the surface of the support member 5 with heat-resistant epoxy adhesive. In the present embodiment, slider 6 is formed as an annular member of a thickness for example of 1 mm and with a composite resin of composition and structure to be explained later. Slider 6 is in contact with the sliding face 2a of the vibration member 2.

Movable member 7 is supported, through an elastic rubber sheet member 17 provided at the bottom thereof, by the intermediate member 15, and an axial load generated by a compression coil spring member 14 elastically positioned between the flange 10c of the output shaft 10 and the second ball bearing 12 is given to the support member 5 in the axial direction thereof through the elastic sheet member 17, thereby maintaining the sliding face 2a of the vibration member 2 and that of the slidable member 6 in pressurized contact.

A casing cover 8 of the vibration wave motor is fixed to the casing 3 by screws 9, and is provided, at the center thereof, with a bearing fitting hole 8b, in which the second ball bearing 12 is axially slidably fitted. Also on the internal periphery of the fitting hole 8b there is provided a screw thread 8c on which a spring pressure regulating nut member 18 is screwed. Nut member 18 is only in contact with the external ring 12a of the second ball bearing 12, of which the internal ring 12b is rendered axially slidable and rotatable with respect to the output shaft 10. Clockwise rotation of the spring pressure regulating nut member 18, by means of a jig (not shown) with two pins inserted into two small holes 18a formed on said nut member 18, causes said nut member 18 to move to the left in the drawing, thereby pushing the second ball bearing 12 in the same direction and compressing the spring member 14, thus increasing the spring force thereof, while counterclockwise rotation of the nut member 18 expands the compression spring member 14, thereby reducing the spring force thereof, whereby the axial load of the output shaft 10 can be regulated. After such regulation, adhesive material is poured through a hole 8a of the casing cover 8, thereby fixing the external ring 12a of the second ball bearing 12 to the casing cover 8.

Between an end of the compression spring member 14 and the second ball bearing 12 there is provided a spacer 13 which is in contact only with the internal ring 12b thereof and ensures smooth rotation of the output shaft. The spring constant of the compression spring member 14 is preferably selected as small as possible, in order to reduce the variation of the axial load as a function of the spring deformation.

Figure 2:
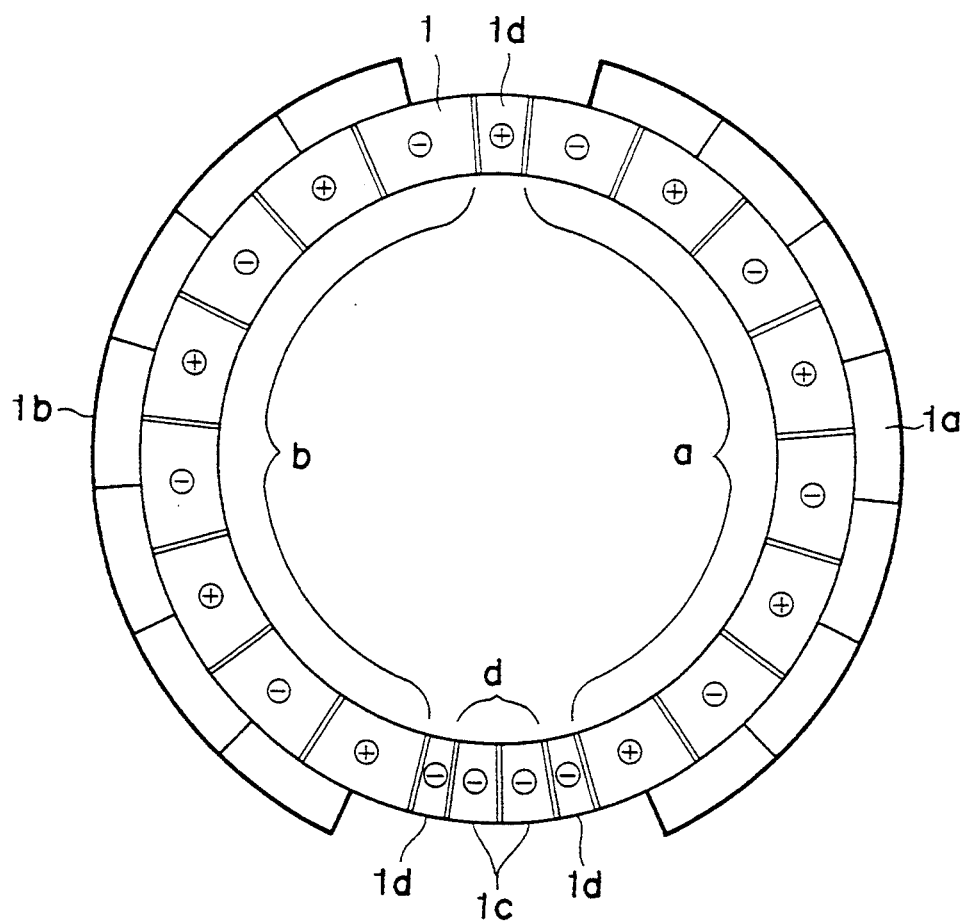
FIG. 2 is a plan view showing the arrangement of piezoelectric elements constituting a vibration member of the motor of FIG. 1.

The aforementioned piezoelectric elements 1 of the vibration member 2 are composed of piezoelectric elements 1a of group A and those 1b of group B, polarized as shown in FIG. 2, two vibration detecting piezoelectric elements 1c for detecting the vibration state, and a grounded common electrode 1d, wherein the elements 1b of group B are arranged with a pitch, displaced in the circumferential direction with respect to those 1a of group A, by ¼ of the wavelength λ of the frequency to be generated.

The piezoelectric elements 1a of group A and those 1b of group B are respectively given cyclic signals of a mutual phase difference of 90° by a known driving circuit (not shown) to generate a travelling vibration wave in the known manner on the surface 2a of the vibration member, whereby the movable member 7, maintained in pressurized contact with said vibration member 2 as explained before, is driven by friction and rotates the output shaft 10 through the intermediate member 15.

Figure 3A:
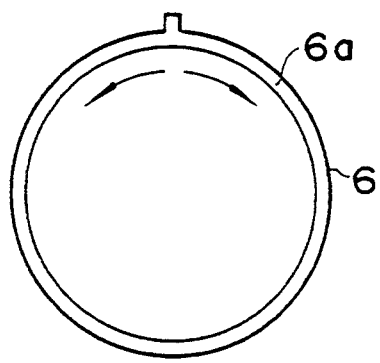
FIGS. 3A and 3B are views showing the injection molding method for forming a slidable member employed in the first embodiment.
Figure 3B:
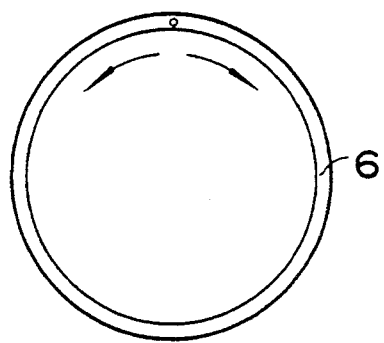

FIG. 3 illustrates the method for forming the annular slider 6 shown in FIG. 1. In the present invention, carbon fibers (replaceable by graphite fibers, carbon whiskers or potassium titanate whiskers) are added to thermoplastic resin with the glass transition point at least equal to 100° C. and are oriented along the circumferential direction of the ring by injection molding. Such orientation of the fibrous reinforcing material can be achieved, for example, by the one-point side gate injection molding shown in FIG. 3A. Injection of thermoplastic resin containing fibrous reinforcing material from a side gate of a mold having an annular disk-shaped cavity achieves orientation of the contained fibers along the circumferential direction by the flow of the resin. Also FIG. 3B illustrates one-point pin gate injection molding, which injects the thermoplastic resin from a pin gate formed on the adhesion face of the annular disk, thereby orienting the above-mentioned fibers contained in said resin, by the flow thereof.

The slider 6 of composite resin, obtained in the above-mentioned injection molding methods, is subjected to polishing of the sliding face 6a, and, in the present embodiment, is fixed to the supporting member 5 to constitute the movable member 7.

For evaluating the performance of the slider 6 of composite resin constituting the movable member 7 of the present invention, sliders were prepared with compositions shown in Table 1.

Each slider was formed by one-point side gate injection molding, and the orientation of the carbon fibers, constituting the fibrous reinforcing filler, was inspected with a stereo microscope. Calculation of Harman orientation parameter based on the carbon fibers oriented along the circumferential direction of the sliding face confirmed that the carbon fibers are at least 50% oriented in such direction.

TABLE 1

|  | Thermoplastic resin | Reinforcing material (+ lubricant) (wt. %) | Glass transition point (°C.) |
| --- | --- | --- | --- |
| Ref. Ex. 1 | PI | carbon fibers (30) | 260 |
| Ref. Ex. 2 | PAI | carbon fibers (30) + (PTFE) (10) | 275 |
| Ref. Ex. 3 | PEI | carbon fibers (20) | 215 |
| Ref. Ex. 4 | PEEK | carbon fibers (30) + (PTFE) (10) | 143 |
| Ref. Ex. 5 | PES | carbon fibers (30) + (PTFE) (5) | 230 |
| Ref. Ex. 6 | aromatic PA | carbon fibers (30) | 125 |
| Ref. Ex. 7 | LCP | carbon fibers (30) | — | wherein:
PI: polyimide
PAI: polyamidimide
PEI: polyetherimide
PEEK: polyetheretherketone
PES: polyethersulfone
aromatic PA: aromatic polyamide
LCP: liquid crystalline polyester
PTFE: polytetrafluoroethylene
Carbon fibers: average diameter 7 μm average length 300 μm Each of the slidable members of the abovementioned structures was integrated in the movable member and tested in the vibration wave motor. As a result, a reduction in the undulation of torque was confirmed.

The vibration member was composed of a base plate of martensite stainless steel having a thermal expansion coefficient close to that in the surfacial direction of the piezoelectric elements and a small internal loss and the piezoelectric elements 1 adhered to the base plate. The top surface of the vibration member, coming into contact with the slidable member 6, was hardened (Vickers hardness Hv of about 1200) by melt emission of tungsten carbide and cobalt.

The fluctuation in torque was also reduced, probably because the elastic modulus of the slidable member is larger in the circumferential direction than in the perpendicular direction and the state of the sliding face is made uniform by the orientation of carbon fibers in the circumferential direction.

Also the squeaking noise at no load or low load was not encountered when aromatic polyester was employed as the matrix resin.

The output of the vibration wave motor for example at a rated torque of 4 kg.cm was highest (>7.0 W) in the aromatic polyester filled with carbon fibers in 30 wt.% (Ref. Example 7), and was in a range of 5.0–5.7 W in various thermoplastic resins filled with carbon fibers in 20 or 30 wt.%, so that the rated output (4.1 W) was satisfied in all the materials employed.

However the movable member formed with the slidable member of composite resin of the Ref. Example 6 composed of aromatic polyamide resin with the glass transition point of 125° C. filled with carbon fibers in 30 wt.% showed adhesion of abraded powder on the sliding face of the vibration member, so that the temperature characteristic (glass transition point) of the material was identified rather insufficient.

Second embodiment

Figure 4:
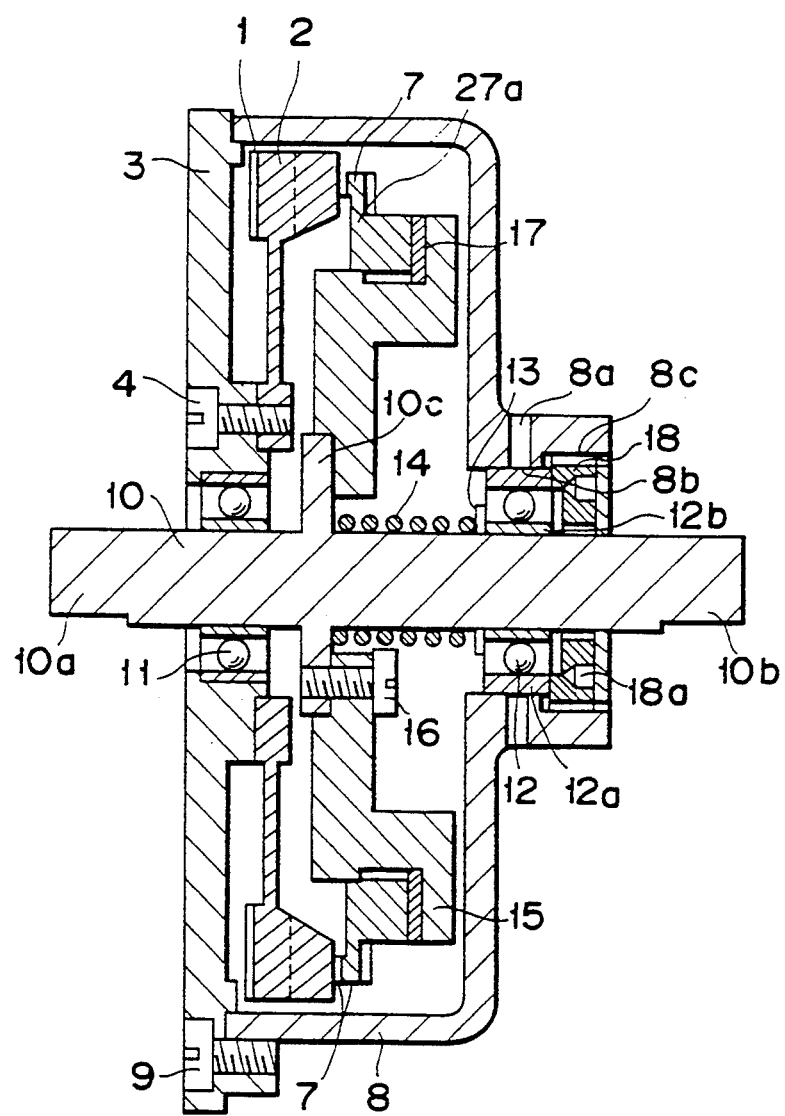

FIG. 4 is a longitudinal cross-sectional view of a second embodiment of the vibration wave motor, which is same as that shown in FIG. 1 except that the movable member 7 is solely composed of a slidable member of fiber-reinforced composite resin. Thus similar components and elements as those in FIG. 1 are represented by the same numbers and will not be explained further.

In such structure, in order to obtain an elasticity equal to that of the elastic flange portion of the aluminum alloy support member 5 constituting the movable member in the first embodiment (FIG. 1), the volume elasticity of the flange portion 27a may be increased to the necessary extent.

FIG. 5 illustrates the method of molding the movable member 27 of the second embodiment (FIG. 4) consisting of the slidable member of composite resin, with orientation of the fibrous reinforcing material along the circumferential direction. FIG. 5A shows an injection molding method of flowing thermoplastic resin containing fibrous reinforcing material from a pin gate positioned in the vicinity of the sliding face 27b, while FIG. 5B illustrates an injection molding method of flowing the resin from a pin gate positioned substantially at the rear side of the sliding face 27b.

The vibration wave motor of the second embodiment explained above can provide advantages similar to those of the vibration wave motor of the foregoing first embodiment.

In the vibration wave motor of the present embodiment, as explained above, the slidable member is formed by injection molding of a composite resin consisting of a thermoplastic resin with the glass transition point at least equal to 100° C., preferably at least equal to 140° C., preferably liquid crystalline aromatic polyester resin, a fibrous reinforcing material such as carbon fibers, and eventually lubricants consisting of at least a fluorinated resin and at least a lead oxide, in such a manner that the fibrous reinforcing material is oriented at the injection molding along the moving direction of the movable member, and the movable member is solely composed of the thus molded slidable member, whereby the motor can reduce the undulation or fluctuation in torque at motor operation under rated conditions and can prevent squeaking noise in the motor operation with no load or with a low load.

Also in the foregoing embodiments, the injection molded slidable member can be either solely used as the movable member or can be affixed to a support member to constitute the movable member, so that there can be dispensed with the conventional steps of cutting an annular slider from the molded cylinder and there can also be achieved a lower cost.

Third embodiment

A third embodiment is includes a movable member composed of composite resin integrally fixed to the output shaft for example with bolts. In the following description of the third embodiment, components same as similar to those in the first or second embodiments are represented by the same numbers, and will not be explained further.

An output shaft 110 has a flange 110c in the middle thereof. An end side 110a of the shaft passes through the internal ring of the first ball bearing 11 and is axially slidably supported thereby, while the other end side 110b passes, axially slidably and rotatably, through the internal ring of the second ball bearing 12 and a shaft hole of the spring pressure regulating nut 18.

A movable member 107 is formed, in the present embodiment, as an annular member and is formed by injection molding of composite resin with the composition and structure to be explained later.

Movable member 107 is integrally fixed, by a fixing bolt 116, to the flange 110c of the output shaft 110, and the sliding face 107a of the movable member 107 is maintained in pressurized contact with the sliding face 2a of the vibration member 2, by an axial load supplied to a compression coil spring 14 elastically provided between the flange 110c and the second ball bearing 12.

A second compression coil spring 119 is provided between the internal ring 11a of the first ball bearing 11 and the flange 110c of the output shaft 110, in order to eliminate the play in the first ball bearing, thereby avoiding the vibration in rotation of the output shaft 110.

The piezoelectric elements 1a of group A and those 1b of group B are respectively given cyclic signals of a mutual phase difference of 90° to generate a travelling vibration wave on the surface of the vibration member 2, whereby the movable member 107, maintained in pressurized contact with the vibration member 2 as explained above, is driven by friction and rotates the output shaft 110.

Figure 7A:
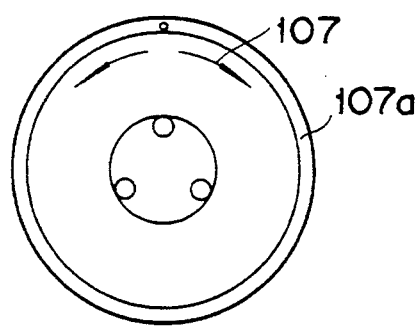
Figure 7B:
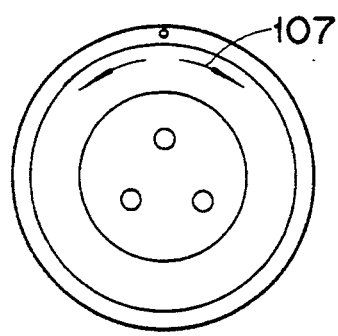
Figure 7B:

FIGS. 7A and 7B illustrate the methods for forming the annular movable member 107 of the present embodiment shown in FIG. 6. In the present embodiment, carbon fibers (replaceable by graphite fibers, carbon whiskers or potassium titanate whiskers) are added to thermoplastic resin with the glass transition point at least equal to 100° C. and are oriented along, the circumferential direction of the ring by injection molding.

FIG. 7A shows injection molding with a one-point side gate, in which thermoplastic resin containing fibrous reinforcing material is injected from a side gate of a mold having an annular disk-shaped cavity, whereby the contained fibers are oriented along the circumferential direction by the flow of the resin material. Also FIG. 7B shows injection molding with a one-point pin gate, in which the thermoplastic resin is injected from a pin gate at the adhesion face of the annular disk, whereby the contained fibers are similarly oriented along the circumferential direction by the flow of the resin material.

The movable member 107 of composite resin can be obtained by such injection molding methods.

The vibration member can be obtained by fixing the piezoelectric elements 1 to a base plate of martensite stainless steel having a thermal expansion coefficient close to that in the surfacial direction of the piezoelectric elements 1 and a small internal loss. Also the surface of the vibration member, coming into contact with the movable member 107, is preferably hardened (Vickers hardness Hv of about 1200) by melt emission of tungsten carbide and cobalt.

In order to evaluate the composite resins constituting the movable member 107, compositions shown in Table 2 were used to make movable members.

Each movable member was formed by one-point side gate injection molding, and the orientation of the carbon fibers, constituting the fibrous reinforcing filler, was inspected with a stereo microscope. Calculation of Harman orientation parameter, based on the carbon fibers oriented along the circumferential direction on the sliding face confirmed that the carbon fibers were at least 70% oriented in that direction.

The vibration member was formed by fixing the piezoelectric elements 1 to a base plate of martensite stainless steel having a thermal expansion coefficient close to that in the surfacial direction of the piezoelectric elements and a small internal loss. Also the surface 2a of the vibration member, coming into contact with the movable member 107, was hardened (Vickers hardness of about 1200) by melt emission of tungsten carbide and cobalt.

TABLE 2

|  | Thermoplastic resin | Reinforcing material (+ lubricant) (wt. %) | Glass transition point (°C.) |
| --- | --- | --- | --- |
| Example 1 | PI | carbon fibers (30) | 260 |
| Example 2 | PAI | carbon fibers (30) + (PTFE) (10) | 275 |
| Example 3 | PEI | carbon fibers (20) | 215 |
| Example 4 | PEEK | carbon fibers (30) + (PTFE) (10) | 143 |
| Example 5 | PES | carbon fibers (30) + (PTFE) (5) | 230 |
| Example 6 | aromatic PA | carbon fibers (30) | 125 |
| Example 7 | LCP | carbon fibers (30) | — | wherein:
PI: polyimide
PAI: polyamidimide
PEI: polyetherimide
PEEK: polyetheretherketone
PES: polyethersulfone
aromatic PA: aromatic polyamide
LCP: liquid crystalline polyester
PTFE: polytetrafluoroethylene
Carbon fibers: average diameter 7 μm average length 300 μm Each of the movable members was assembled in the vibration wave motor shown in FIG. 6 and was tested. As a result, a reduction in the undulation of torque was confirmed.

Also the fluctuation in torque was reduced, probably because the elastic modulus of the movable member was larger in the circumferential direction than in the perpendicular direction and the state of the sliding face is made uniform, by the orientation of carbon fibers in the circumferential direction.

Also the squeaking noise at no load or low load was not encountered when aromatic polyester was employed as the matrix resin.

Since aromatic polyester resin is so-called liquid crystalline polymer of which molecules do not easily bend when fused and solidify with orientation in the flowing direction when cooled, as shown in FIG. 8, the molded products employing such aromatic polyester as the matrix resin have a multi-layered structure as shown in FIG. 9. Also at the surface of the molded product, the molecular chains form a strongly oriented layer in the flowing direction by the shearing from the surface of the mold, whereby there appears an anisotropy that the strength and elasticity are sufficiently high in the moving direction of the movable member whereas the bending modulus in the perpendicular direction is $\frac{1}{4}$ of that in the moving direction. Consequently, when such molded movable member is employed in the vibration wave motor, it may be directly fixed to the output shaft, without transmission of vibration to the shaft because of the high vibration attenuating characteristics close to those of rubber. The so-called squeaking noise can be prevented.

The output of the vibration motor for example at a rated torque of 4 kg.cm was highest (>7.0 W) in the aromatic polyester filled with carbon fibers in 30 wt.%, and was in a range of 5.0–5.7 W in various thermoplastic resins-filled with carbon fibers in 20 or 30 wt.%, so that the rated output (4.1 W) was satisfied in all the materials employed.

Fourth embodiment

A fourth embodiment explained in the following includes a movable member connected to the rotary shaft through an elastic member instead of a metallic intermediate member for example of aluminum alloy.

FIG. 10 is a longitudinal cross-sectional view of a fourth embodiment of the vibration wave motor of the present invention.

A disk-shaped movable member 207 is fixed, by a screw 116, to the flange 110c of the output shaft 110, across a rubber-like elastic member 217, and the sliding face of the movable member 207 is maintained in pressurized contact with the sliding face 2a of the vibration member 2, by an axial load generated by a compression coil spring member 14 elastically provided between the flange 110c of the output shaft 110 and the second ball bearing 12.

The second compression coil spring 119 is provided between the internal ring 11a of the first ball bearing 11 and the flange 110c of the output shaft 110, in order to eliminate the play in the first ball bearing, thereby avoiding the vibration in rotation of the output shaft 110.

The aforementioned piezoelectric elements 1 of the vibration member 2 are composed of piezoelectric elements 1a of group A and those 1b of group B, polarized as shown in FIG. 2, two vibration detecting piezoelectric elements 1c for detecting the vibration state, and a grounded common electrode 1d, wherein the elements 1b of group B are arranged with a pitch, displaced in the circumferential direction with respect to those 1a of group A, by $\frac{1}{4}$ of the wavelength λ of the frequency to be generated.

The piezoelectric elements 1a of group A and those 1b of group B are respectively given cyclic signals of a mutual phase difference of 90° to generate a travelling vibration wave on the surface 2a of the vibration member 2, whereby the movable member 107, maintained in pressurized contact with the vibration member 2 as explained above, is driven by friction and rotates the output shaft 110 through the intermediate member 15.

The material for vibration member 2 is preferably composed of martensite stainless steel having a relatively small thermal expansion coefficient for a metal and close to that in the circumferential direction of the piezoelectric elements 1. This material is also preferred because of its small internal loss. Also the sliding face of the vibration member is preferably formed as a hard surface (Hv=1200) obtained by melt emission of tungsten carbide and cobalt, or more inexpensively composed of Nickel phosphor alloy containing silicon carbide (SiC) (Hv=1200 after annealing).

For evaluating the composite resin for constituting the movable member 107 of the above-explained structure, movable members were prepared with the compositions shown in Table 3.

TABLE 3

| Thermoplastic resin | Filler (wt. %) | Glass transition point (°C.) | Bending modulus (kg/cm$^2$) |
|---|---|---|---|
| non-fiber reinforced | | | |
| PI | glass-like carbon (12) + PTFE (8.5) | 250 | 40000 |
| PAI | GRP (20) + PTFE (3) | 275 | 75000 |
| PI | glass-like carbon (30) | 250 | 51000 |
| PI | Mo (12) + PTFE (5) | 250 | 60500 |
| LCP | GRP (25) | 120 | 110000 |
| LCP | PTFE (30) | 120 | 85000 |
| carbon fiber-reinforced | | | |
| PI | carbon fibers (30) | 250 | 180000 |
| PAI | carbon fibers (30) + PTFE (5) | 275 | 172000 |
| PEI | carbon fibers (20) | 215 | 122500 |
| PEEK | carbon fibers (30) + PTFE (5) | 143 | 137000 |
| PES | carbon fibers (30) + PTFE (5) | 230 | 95000 |
| aromatic PA | carbon fibers (30) | 125 | 188000 |
| LCP | carbon fibers (30) | 120 | 290000 |

TABLE 3-continued

| Thermoplastic resin | Filler (wt. %) | Glass transition point (°C.) | Bending modulus (kg/cm²) |
| --- | --- | --- | --- |
| PES | carbon fibers (30) | 230 | 155000 | wherein:
PI: polyimide
PAI: polyamidimide
PEI: polyetherimide
PEEK: polyetheretherketone
PES: polyethersulfone
aromatic PA: aromatic polyamide
LCP: liquid crystalline polyester
PTFE: polytetrafluoroethylene
Carbon fibers: average diameter 7 μm average length 300 μm
glass-like carbon beads: average diameter 10 μm
Mo: molybdenum 5 μm
GRP: amorphous graphite FIGS. 11A and 11B illustrate the methods for forming the annular movable member 207 of the present embodiment shown in FIG. 10. In the present embodiment, carbon fibers replaceable by graphite fibers, carbon whiskers or potassium titanate whiskers) are added to thermoplastic resin with the glass transition point at least equal to 100° C. and are oriented along the circumferential direction of the ring by injection molding.

FIG. 11A shows injection molding with a one-point side gate, in which thermoplastic resin containing fibrous reinforcing material is injected from a side gate of a mold having an annular disk-shaped cavity, whereby the contained fibers are oriented along the circumferential direction by the flow of said the resin material. Also FIG. 11B shows injection molding with a one-point pin gate, in which said the thermoplastic resin is injected from a pin gate at the adhesion face of the annular disk, whereby the contained fibers are similarly oriented along the circumferential direction by the flow of the resin material.

The movable member 207 of composite resin filled with fibrous reinforcing material can be obtained by such injection molding methods, with reinforcing fibers oriented along the circumferential direction.

The movable members were formed by one-point side gate injection molding, and the orientation of the carbon fibers, constituting the fibrous reinforcing material, was inspected with a stereo microscope. Calculation of Harman orientation parameter, based on the carbon fibers oriented along the circumferential direction on the sliding face, confirmed that the carbon fibers in the slidable member are at least 70% oriented. Each of the movable members 207 shown in Table 3 was subjected to surface polishing and assembled in the vibration wave motor of the structure shown in FIG. 10, by fixing to the output shaft 110 across the elastic member 217 for the evaluation of motor performance.

The results of tests indicate that the undulation in torque is more reduced with the thermoplastic resin of a higher glass transition point.

Also the fluctuation in torque in the above-mentioned movable members without fiber reinforcement was confirmed to be less than that in the conventional movable members, because of basically improved uniformity of the properties and strength of the sliding face. Furthermore, the fluctuation is significantly reduced in the movable members filled with fibrous reinforcing material, presumably because the elastic modulus is larger in the circumferential direction than in the perpendicular direction and the uniform properties and strength of the sliding face, resulting from the orientation of the carbon fibers along the circumferential direction of the sliding face.

Furthermore, the squeaking noise in the motor operation with no or low load was rarely found in the movable members of composite resin without fiber reinforcement, because the modulus and hardness were lower and more uniform than in the conventional movable members.

Also a further reduction of the squeaking noise was confirmed in the movable members of fiber-reinforced composite resin formed by injection molding.

An enhanced reduction of the squeaking noise was confirmed in the case where the aromatic polyester was employed as the matrix resin, either filled with non-fibrous or fibrous reinforcing material, in comparison with the movable members of other composite resins. This is presumably due to anisotropy in elastic modulus, resulting from the solidification of molecules of the fibrous reinforcing material in the state oriented in the flowing direction.

The output of the vibration wave motor, for example at a rated torque of 4 kg.cm, was largest (>7.0 W) in the case of the aromatic polyester filled with carbon fibers in the 30 wt.%, and was in a range of 5.2–5.7 W in case of various thermoplastic resins filled with carbon fibers in an amount of 20 or 30 wt.%. Also it was in a range of 5.2–5.5 W in the case of various thermoplastic resins filled with fibrous reinforcing material, and was in a range of 4.7–5.2 W in the case of various thermoplastic resins filled with non-fibrous reinforcing materials.

The rated output (4.1 W) was satisfied in all the materials tested.

In the vibration wave motor of the present embodiment, as explained above, the movable member is formed by integral injection molding of a composite resin consisting of a thermoplastic resin with the glass transition point at least equal to 100° C., preferably at least equal to 140° C. or more preferably liquid crystalline aromatic polyester resin, instead of the thermoplastic resin conventionally employed for forming the slider of the movable member; a fibrous or non-fibrous reinforcing material; and lubricants such as tetrafluoroethylene and lead oxide, and the movable member is fixed to the rotary output shaft, whereby the motor can reduce the undulation or fluctuation in torque at the motor operation under rated conditions and can also prevent squeaking noise in motor operation with no or low load. In addition, since the movable member can be singly composed of an injection molded product, there can be provided a novel vibration wave motor which can dispense with the conventional steps for forming the movable member and can therefore reduce the cost.

Also in the vibration wave motor of the present invention, as explained in the foregoing, the slidable member is formed by injection molding of a composite resin consisting of a thermoplastic resin with the glass transition point at least equal to 100° C., preferably at least equal to 140° C. and a fibrous reinforcing material such as carbon fibers, in such a manner that the fibrous reinforcing material is oriented at the injection molding along the moving direction of the movable member, and the movable member is directly composed of the thus molded fiber-reinforced product, whereby the motor can reduce the undulation or fluctuation in torque at motor operation under rated conditions and can also prevent squeaking noise in motor operation with no or low load.

Furthermore, in the present invention, since the movable member can be composed solely of the injection molded slidable member or of the slidable member affixed to a support member, there can be dispensed with the conventional steps of cutting an annular slidable member from a molded cylinder and there can be provided a novel vibration wave motor of a lower cost.

What is claimed is:

1. A vibration wave motor comprising:
   a vibration member for generating a vibration wave by an applied electric signal; and
   a contacting member having a sliding portion which contacts said vibration member and is adapted to receive the vibration wave generated in said vibration member;
   wherein said sliding portion is composed of a thermoplastic resin with a glass transition point at least equal to 100° C., containing non-fibrous reinforcing material and formed by injection molding, and wherein said non-fibrous reinforcing material is composed of glass-like carbon beads.

2. A vibration wave motor according to claim 1, wherein the average diameter of the beads is 10 μm.

3. A vibration wave motor comprising:
   a vibration member for generating a vibration wave by an applied electrical signal; and
   a contacting member having a sliding portion which contacts said vibration member and is adapted to receive the vibration wave generated in said vibration member;
   wherein said sliding portion is composed of a thermoplastic resin with a glass transition point greater than or equal to 100° C., containing non-fibrous reinforcing material and formed by injection molding, and wherein said non-fibrous reinforcing material is composed of glass-like carbon beads.

4. A vibration wave motor according to claim 3, wherein the average diameter of the beads is 10 μm.

5. A vibration wave motor according to claim 3, wherein the vibration member is composed of stainless steel.

6. A vibration wave motor according to claim 3, wherein the vibration member is composed of martensite stainless steel.

7. A vibration wave motor according to claim 3, wherein said resin is composed of liquid crystalline resin.

* * * * *

UNITED STATES PATENT AND TRADEMARK OFFICE
CERTIFICATE OF CORRECTION

PATENT NO. : 5,352,950  
DATED : October 4, 1994  
INVENTOR(S) : SHIRASAKI

Page 1 of 3

It is certified that error appears in the above-indentified patent and that said Letters Patent is hereby corrected as shown below:

Column 1

Line 28, "ultra hard" should read --ultra-hard--.  
    Line 50, "maybe" should read --may be--.

Column 3

Line 6, "SUMMARY OF THE INVENTION" should be deleted.

Column 4

Line 30, "the in" should read --in the--.  
    Line 51, "ultra hard" should read --ultra-hard--.  
    Line 66, "Fig., 4" should read --FIG. 4--.

Column 5

Line 7, "Figs, 7A" should read --FIGS. 7A--.  
    Line 45, "said the" should read --the--.  
    Line 47, "said the" should read --the--.  
    Line 49, "said" should read --the--.

Column 6

Line 9, "2aof" should read --2a of--.  
    Line 24, "said" (both occurrences) should read --the--.  
    Line 60, "said" should read --the--.

UNITED STATES PATENT AND TRADEMARK OFFICE
CERTIFICATE OF CORRECTION

PATENT NO. : 5,352,950  Page 2 of 3
DATED : October 4, 1994
INVENTOR(S) : SHIRASAKI It is certified that error appears in the above-indentified patent and that said Letters Patent is hereby corrected as shown below:

Column 7

Line 13, "said" should read --the--.
    Line 53, "abovementioned" should read --above-mentioned--.

Column 8

Line 21, "rather" should read --as rather--.

Column 9

Line 12, "is" should be deleted.
    Line 16, "as" should be --or--.
    Line 57, "along," should read --along--.

Column 13

Line 21, "replaceable" should read --(replaceable--.
    Line 31, "said the" should read --the--.
    Line 33, "said the" should read --the--.
    Line 49, "25" should be deleted.
    Line 50, "Each" should read --¶ Each--.

UNITED STATES PATENT AND TRADEMARK OFFICE
CERTIFICATE OF CORRECTION

PATENT NO. : 5,352,950          Page 3 of 3

DATED : October 4, 1994

INVENTOR(S) : SHIRASAKI

It is certified that error appears in the above-indentified patent and that said Letters Patent is hereby corrected as shown below:

<u>Column 14</u>

Line 40, "in the" should read --being--; and "in case" should read --in the case--.
    Line 61, "at the" should read --at--.
    Line 65, "singly" should read --solely--.

Signed and Sealed this

Twenty-third Day of May, 1995

Attest:

BRUCE LEHMAN

Attesting Officer      Commissioner of Patents and Trademarks